(12) United States Patent  
Darch et al.

(10) Patent No.: US 9,190,642 B2
(45) Date of Patent: Nov. 17, 2015

(54) CONTOURED BATTERY CASE BASED ON CELL SHAPES

(71) Applicant: EAGLEPICHER TECHNOLOGIES, LLC, Joplin, MO (US)

(72) Inventors: David Andrew Timothy Darch, Neosho, MO (US); Wayne Edward White, Joplin, MO (US); Mario Destephen, Joplin, MO (US); David Scott Heckmaster, Neosho, MO (US); Eivind Listerud, Osceola, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 220 days.

(21) Appl. No.: 13/909,510

(22) Filed: Jun. 4, 2013

(65) Prior Publication Data

US 2013/0323558 A1 Dec. 5, 2013

Related U.S. Application Data

(60) Provisional application No. 61/655,135, filed on Jun. 4, 2012.

(51) Int. Cl.
| | |
|---|---|
| *H01M 2/10* | (2006.01) |
| *H01M 10/50* | (2006.01) |
| *H01M 10/643* | (2014.01) |
| *H01M 10/6555* | (2014.01) |
| *H01M 10/42* | (2006.01) |

(52) U.S. Cl.
CPC ............ *H01M 2/105* (2013.01); *H01M 2/1094* (2013.01); *H01M 10/503* (2013.01); *H01M 10/643* (2015.04); *H01M 10/6555* (2015.04); *H01M 10/425* (2013.01)

(58) Field of Classification Search
CPC .............. H01M 2/105; H01M 10/503; H01M 10/5055; H01M 2/1094; H01M 10/425
See application file for complete search history.

(56) References Cited

U.S. PATENT DOCUMENTS

| | | | |
|---|---|---|---|
| 2002/0177035 A1* | 11/2002 | Oweis et al. ................. | 429/120 |
| 2006/0078789 A1* | 4/2006 | Wegner ........................ | 429/120 |

(Continued)

FOREIGN PATENT DOCUMENTS

| | | | |
|---|---|---|---|
| JP | 2006100147 A | * | 4/2006 |
| JP | A-2006-100147 | | 4/2006 |

(Continued)

OTHER PUBLICATIONS

English Translation of JP 2006100147A.*

(Continued)

*Primary Examiner* — Stewart Fraser
(74) *Attorney, Agent, or Firm* — Sutherland Asbill & Brennan LLP

(57) ABSTRACT

A battery case houses a battery with a plurality of non-prismatic electrochemical cells and at least one electronic component. The battery case includes a plurality of cell housings and at least one electronic component housing that accommodates the at least one electronic component. The plurality of cell housings each (1) define an internal space sized to accommodate one of the electrochemical cells, and (2) include (a) an internal surface at least a portion of which is shaped to substantially correspond to a non-prismatic exterior surface of the one of the electrochemical cells to be housed by the cell housing, and (b) an external surface at least a portion of which follows contours of a corresponding portion of the inner surface.

26 Claims, 5 Drawing Sheets

(56) References Cited

U.S. PATENT DOCUMENTS

| | | | |
|---|---|---|---|
| 2009/0286143 A1* | 11/2009 | Matthias et al. | 429/90 |
| 2011/0097619 A1* | 4/2011 | Park | 429/159 |
| 2011/0250476 A1* | 10/2011 | Taga | 429/7 |
| 2012/0045671 A1* | 2/2012 | Miller et al. | 429/82 |

FOREIGN PATENT DOCUMENTS

| | | | |
|---|---|---|---|
| JP | 2007047488 A * | 2/2007 | |
| JP | A-2008-47488 | 2/2008 | |
| JP | 2012059373 A * | 3/2012 | |
| JP | A-2012-059373 | 3/2012 | |

OTHER PUBLICATIONS

English Translation of JP 2008047488A.*
English Translation JP 2012059373A.*
Sep. 3, 2013 European Search Report issued in European Patent Application No. 13170521.2.

* cited by examiner

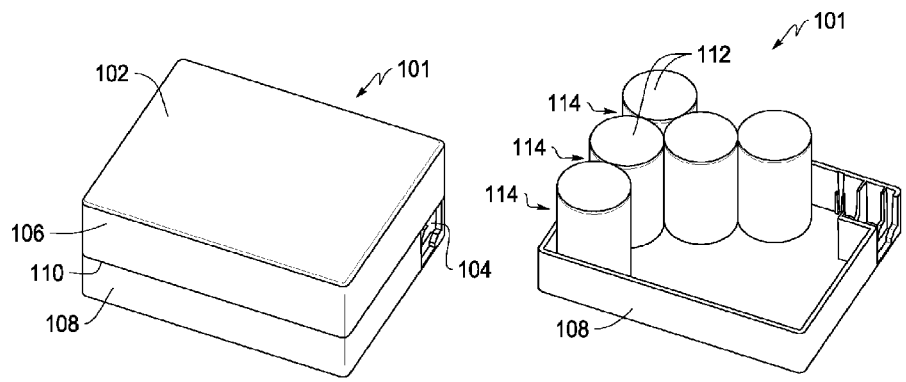
FIG. 1A
RELATED ART
FIG. 1B
RELATED ART
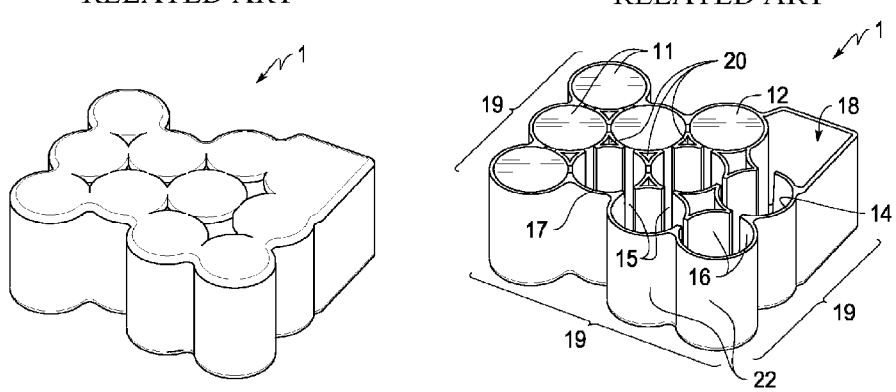
FIG. 2A
FIG. 2B
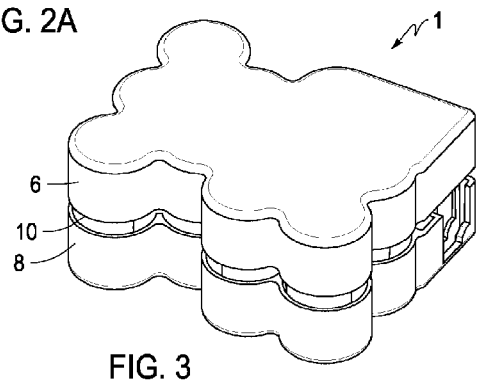
FIG. 3

CONTOURED BATTERY CASE BASED ON CELL SHAPES

This nonprovisional application claims the benefit of U.S. Provisional Application No. 61/655,135, filed Jun. 4, 2012.

TECHNICAL FIELD

The exemplary embodiments relate to a battery case for holding a battery with multiple electrochemical cells in series or parallel configuration and at least one electronic component.

BACKGROUND

Electrical batteries are used in a wide variety of applications requiring a portable power source. For example, portable devices such as laptops, tablets, mobile phones, portable flashlights, wristwatches, smoke detectors, vehicles, hearing aids and other medical devices, communications radios, light emitting devices, sound systems, night vision goggles, and even portable battery recharging units require a portable power source so that the devices may be used while they are in a portable mode. Some devices may be engineered to include a connected housing for a battery, such that the battery can be transported as an integral component of the device. Others devices may be engineered so that the battery can be carried separately, with interfaces to be plugged into a separately carried battery. These separately carried batteries may then serve as a power source for any variety of devices that have the appropriate interface for drawing electricity from the battery.

SUMMARY

Whether batteries are transported as integral components of a device or separately carried (i.e., serving as power sources for any variety of devices with the appropriate interface for drawing electricity from the battery), there is a need for better volumetric packaging efficiency of the cells. Hereinafter, volumetric packaging efficiency will be defined as $(\Sigma_{i=1}^{n} V_i)/V_C$, where $V_i$ is the volume of a cell with index i, n is the total number of cells, and $V_C$ is the total volume of an exterior case of the battery. In particular, it is understood that because the exterior case must encompass all of the cells, the volumetric packaging efficiency can never be higher than 1. Better volumetric packaging efficiency reduces the overall bulk that must be carried, allowing for a space-limited carrier to carry more of other objects or matter and/or to maneuver more easily.

While it is relatively easy to achieve efficient volumetric packaging of certain prismatic cells (e.g., cuboid, triangular prisms), it is more difficult to achieve the same level of efficiency with cells of other shapes such as irregular prisms and curvilinear shapes. Thus, it is advantageous to provide better (i.e., higher) volumetric packaging efficiency of the cells with respect to certain prismatic shapes and curvilinear shapes.

Whether batteries are transported as integral components of a device or separately carried (i.e., serving as power sources for any variety of devices with the appropriate interface for drawing electricity from the battery), it is advantageous to provide reduced battery weight. For example, reduced battery weight is desired for weight-limited carriers to carry more of other objects or matter and/or to maneuver more easily.

Electrical batteries typically have one or more electrochemical cells that store chemical energy and convert the stored chemical energy into electrical energy via electrochemical reactions. The electrochemical reactions are exothermic, producing both electricity, a desired product of the reactions, and thermal energy (i.e., heat). Thermal energy is generally undesired due to a property of batteries to suffer reduced lifespans (i.e., time periods of usability) and reduced range of applications. Prolonged exposure to heat may reduce the lifespan of a battery by reducing the internal electrical resistances of the cells and thereby increasing the rate of discharge, including self-discharge. Heat may also limit the range of applications of batteries. For example, heat may limit discharge rates as higher discharge rates will generate even more heat, and the battery must be limited to the amount of discharge rate allowed. In another example of reducing the range of applications of a battery, heat may limit the environmental conditions in which the battery may be operated since, in hot ambient conditions, the discharge rates must be even more limited. Excessive heat is also a safety issue since thermal runaway, venting, and/or explosions may occur if the battery cells reach certain temperature thresholds.

As such, it is advantageous to mitigate the effect of heat on the battery.

The exemplary embodiments described herein address the effect of heat on a battery by reducing the thermal resistance between the heat-creating electrochemical cells and the outer surface of the battery case, thus enhancing heat dissipation and allowing for a safer battery with a greater range of use and a greater lifespan.

The exemplary embodiments relate to battery cases for holding batteries with multiple electrochemical cells in series or parallel configuration and at least one electronic component. The battery cases include multiple cell housings that each have an internal space sized to accommodate one of the electrochemical cells. The cell housings include an internal surface at least a portion of which is shaped to substantially correspond to an exterior surface of an electrochemical cell to be housed by the cell housing. The cell housings preferably also include an external surface at least a portion of which follows contours of a corresponding portion of the inner surface. The battery cases include at least one electronic component housing that accommodates an electronic component.

In an embodiment, a shape of the electronic component housing is different from a shape of each of the cell housings.

In an embodiment, the external surfaces of the cell housings define a plurality of interior volumes that are external to each of the cell housings and internal to an outer periphery of the battery case. Further, at least some of the interior volumes preferably house a heat conductive material selected from the group consisting of metal, composite, and polymer, though any heat conductive material can be used. Preferably, the cell housings are made of a heat conductive material selected from the group consisting of metal, composite, and polymer, though any heat conductive material may be used.

In some embodiments, the external surface of each cell housing also is contoured to the shape of the electrochemical cell to be housed therein. In such embodiments, an outer periphery of the battery case may include four non-planar sides.

In an embodiment, the internal surface of each cell housing is cylindrical to match the electrochemical cells having a substantially cylindrical shape. Preferably, each of the cell housings completely encloses an outer circumferential surface of the electrochemical cell to be accommodated by the cell housing. More preferably, the interior surface is sized to accommodate the at least one electrochemical cell with a gap of no more than about 0.1 inch between the outer surface of the electrochemical cell and the internal surface.

In some embodiments, the internal surface of each cell housing has a non-prismatic shape to match the electrochemical cells having a non-prismatic shape.

In some embodiments, at least some of the cell housings define an opening connecting a first internal space defined by the cell housing to a second internal space defined by an adjacent cell housing.

Preferably, the battery case includes a lower casing defining a plurality of lower casing cavities, and an upper casing defining a plurality of upper casing cavities equal to the number of lower casing cavities. The upper casing is formed to fit the lower casing so that the lower casing cavities and the upper casing cavities define the internal spaces of the plurality of cell housings, and the lower casing and the upper casing together define the plurality of cell housings. Preferably, a volume of each of the lower casing cavities is less than a volume of each of the upper casing cavities.

A further aspect of the exemplary embodiments includes a method of manufacturing the upper casing and lower casing including the steps of molding the lower casing into a single lower piece and molding the upper casing into a single upper piece.

BRIEF DESCRIPTION OF THE DRAWINGS

Various exemplary embodiments of a battery case to which aspects of the invention are applied will be described in detail with reference to the following drawings in which:

FIG. 1A shows an elevation view of an exterior of a known battery case;

FIG. 1B shows an elevation view of a revealed interior of the FIG. 1A battery case;

FIG. 2A shows an elevation view of an battery case exterior of one embodiment;

FIG. 2B shows an elevation view of a partially-revealed battery case interior of the embodiment of FIG. 2A;

FIG. 3 shows an elevation view of a battery case in an embodiment;

DETAILED DESCRIPTION OF EMBODIMENTS

Figure 4:
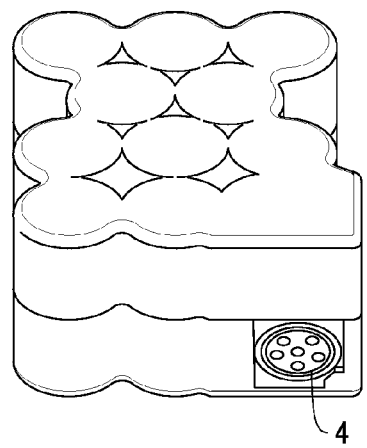
FIG. 4 shows a side view of a prototype of a battery case in an embodiment.

Embodiments of the invention are described below with reference to FIGS. 1-12. Herein, the nouns "electrochemical cell" and "cell" and their plural forms may be used interchangeably.

FIG. 1A shows an elevation view of an exterior of a known battery case 101. The exterior casing 102 has a substantially cuboid exterior surface with an interface cavity 104 into which an electronic interface component (not shown) can be plugged. The exterior casing 102 is manufactured from two pieces: an upper casing 106, and a lower casing 108. The two pieces are manufactured to have substantially the same volume so that they meet at an equatorial plane 110. The equatorial plane 110 shows where the upper casing 106 fits the lower casing 108.

FIG. 1B shows an elevation view of the battery case 101 of FIG. 1A, where the upper casing 106 has been removed to reveal the interior of the battery case 101. A plurality of disconnected cells 112 each are placed in the case 101 (only 5 of 10 total cells are shown). Because the cells 112 are cylindrical and the exterior casing 102 has a substantially cuboid exterior surface, there exist extraneous spaces 114 between the exterior surfaces of the cells and the substantially cuboid exterior surface of the battery case 101. These extraneous spaces 114 reduce the volumetric packaging efficiency of the battery case 101.

Further, because the cells 112 are disconnected from one another, there exist extraneous spaces 114 between the cells 112 that further reduce the volumetric packaging efficiency of the battery case 101.

Another disadvantage of the extraneous spaces 114 is that they increase the overall thermal resistivity of the battery case 101, since the air within the extraneous spaces 114 acts as a heat insulator. Thus, heat present at the external surface of the cells 112 is not efficiently conducted to the battery case 1, which causes the cells to become over-heated. Although the thermal resistivity of the battery case 101 could be reduced by filling the extraneous spaces 114 with heat conductive material, that would increase the manufacturing cost of the battery as well as increase the weight of the battery.

FIG. 2A shows an elevation view of a battery case exterior of one embodiment of the invention. In this embodiment, the exterior casing 2 has an exterior surface that is not substantially cuboid.

FIG. 2B shows an elevation view of a partially-revealed battery case interior of the embodiment of FIG. 2A (the top of the case is not shown in FIG. 2B). In this embodiment, as preferred, a plurality of cell housings 12 are interconnected. However, it is also possible to have one or more cell housings 12 that are disconnected from each other, Each cell housing 12 may define an internal space 14 sized to accommodate one or more of the electrochemical cells. Each cell housing 12 may include an internal surface 16 at least a portion of which is contoured to a shape of an electrochemical cell to be housed by the cell housing 12. Of course, because a cell housing 12 may house more than one cell, at least a portion of the internal surface 16 may be contoured to a shape of more than one cell to be housed by the cell housing 12. Each cell housing 12 further may include an external surface 22 that is in contact with another external surface 22 of at least one other cell housing 12. This feature reduces the overall volume of the battery thereby increasing the volumetric packaging efficiency.

The internal surfaces 16 and external surfaces 22 of each cell housing 12 define a wall 17. Preferably, the wall 17 has a substantially uniform thickness. Alternatively, the wall 17 may have a non-uniform thickness which varies dependent, for example, on a varying temperature profile of the housed cell 11. For example, the wall 17 may be thicker and thus have more heat conductive material at the midsection of the housed cell 11 if the cell 11 is of a type where the most heat is output from the midsection of the cell 11. Alternatively, the wall 17 may have a substantially uniform thickness with a varying density dependent on a varying temperature profile of the housed cell 11. For example, the wall 17 may be equally thick but more dense and thus have more heat conductive material at the midsection of the housed cell 11 if the cell 11 is of a type where the most heat is output from the midsection of the cell 11.

The cell housings 12 may also have openings 15 (elongated slots in the illustrated embodiment) connecting their respective internal spaces 14 to the internal spaces of adjacent cells 11. The openings 15 may serve to allow cell connector tabs (not shown) to connect adjacent cells 11 and/or they may serve as gas exhaust passages. The openings also permit a tighter packaging of the cells 11, reducing the total volume and weight of the battery case 1.

The battery case 1 may also comprise at least one electronic component housing 18 that accommodates the at least one electronic component (not shown). The electronic component may include a circuit board, a microprocessor, cell monitors, LED lights (for example, indicating state-of-charge SOC), drainage elements, voltage mode switches (for example, for switching between series and parallel configuration), thermal fuses (for example, shutting down the battery pack when the temperature of a particular cell exceeds a predetermined threshold), any other electronic component related to batteries, or any combination thereof. The shape of the electronic component housing 18 may be different from a shape of each of the cell housings 12.

The electronic component housing 18 may be positioned near an outer periphery of the battery case 1, such as at one corner of the case as shown in FIG. 2B. An advantage of such a layout is in providing an accessible interface 4 (see FIG. 4) for plugging in a device. However, the interface 4 does not have to be positioned at a longitudinal exterior surface of the electronic component housing 18—the interface 4 may be positioned at a top exterior surface or a bottom exterior surface of the electronic component housing. In such an embodiment, the electronic component housing 18 can be positioned such that it is enclosed on all longitudinal sides by cell housings 12. This embodiment provides an additional advantage of further reducing the number of cells 11 whose longitudinal external surfaces 22 are not at an outer periphery of the battery case 1. It is preferable to minimize the number of cells whose longitudinal external surfaces 22 are not at an outer periphery of the battery case 1, because those cells tend to have more thermal resistivity due to the fact that they are more insulated than other cells. At least another advantage of this embodiment is in further reducing extraneous internal volumes 20 within the battery case 1. For example, an electronic component housing 18 with a substantially prismatic shape maybe made with a substantially hexagonal bottom surface and substantially hexagonal top surface wherein the minor diameters of the hexagons are substantially equal to each other and equal to the diameters of the top surfaces and bottom surfaces of adjacent cell housings 12.

In another embodiment, the electronic component housing 18 can be positioned such that it is enclosed on all longitudinal sides by cell housings 12, but where the interface 4 of the electronic components) is positioned at a longitudinal exterior surface of the battery case 1. In this embodiment, the interface 4 may be connected with extended wiring so as to connect it to the electronic component(s) within the more centrally-located electronic component housing 18.

In another embodiment, the electronic component housing 18 also serves as a cell housing 12. In this embodiment, the interior and exterior surfaces of the electronic component housing 18 may contour to the shape of the housed cell except on the side(s) with the electronic components.

In one embodiment, the external surfaces 22 of the cell housings 12 define a plurality of interior volumes 20 that are external to each of the cell housings 12 and internal to an outer periphery of the battery case 1. The interior volumes 20 are entirely encompassed on their longitudinal sides solely by the external surfaces 22 of the cell housings 12 rather than by any exterior casing 2 of the battery case 1.

Preferably, an outer periphery of the battery case 1 includes four non-planar sides 19. The sides 19 are non-planar since external surfaces 22 of the cell housings 12 define the sides 19. This increases volumetric packaging efficiency by reducing the volume within the extraneous spaces and thus the total volume of the battery case 1, reduces weight by reducing the amount of material that must be used to manufacture the case, and reduces thermal resistivity by eliminating at least some heat insulating internal volumes 20.

Figure 5:
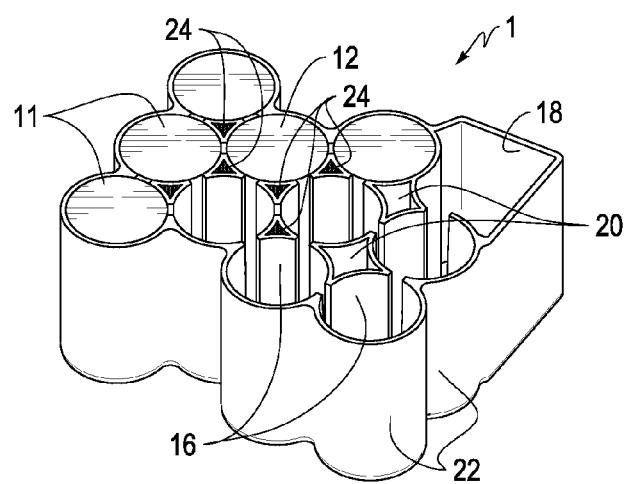
FIG. 5 shows an elevation view of a battery case in an embodiment.
Figure 6:
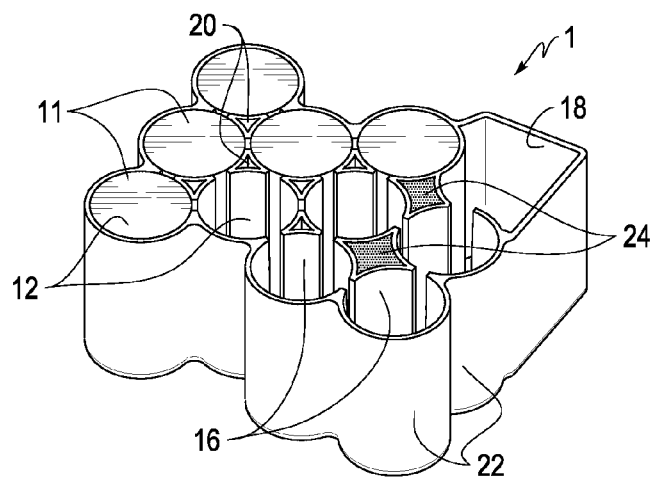
FIG. 6 shows an elevation view of a battery case in an embodiment.

FIGS. 5 and 6 show an embodiment wherein the interior volumes 20 can be empty (i.e., have airspace only) to reduce the overall weight of the battery case 1, or they can be filled with a heat conductive filler material 24 which may be metal, composite, polymer, or any other heat conductive material, or a combination thereof to reduce the thermal resistivity of the battery case 1.

Preferably, at least a portion of the external surface 22 of each cell housing 12 also is contoured to the shape of the electrochemical cell 11 to be housed therein. If the cells 11 are cylindrical, then the internal surface 16 and external surface 22 of each cell housing 12 may be shaped to fit at least a portion of the cells 11; if the cells are another non-prismatic shape, then the internal surface 16 and the external surface 22 of each cell housing 12 may be shaped to fit at least a portion of the non-prismatic cells; and if the cells are a prismatic shape, then the internal surface 16 and the external surface 22 of each cell housing 12 may be shaped to fit at least a portion of the prismatic cells. As an example, lithium carbonmonofluoride batteries (CFx batteries) and batteries with CFx-hybrid chemistries are generally manufactured with a substantially cylindrical shape. As such, the aforementioned challenge exists with achieving a high volumetric packaging efficiency of CFx batteries, since the exterior surfaces of the cells form convex curvilinear surfaces which are geometrically difficult to fit together without creating interior volumes 20. Further, CFx batteries and CFx-hybrid batteries have relatively high heat output and thus the present embodiment is particularly useful when applied to this particular battery chemistry. Of course, the embodiments described herein offer advantages with batteries of other chemistries including, but not limited to, Li-Ion, Li—$SOCl_2$, Li—$MnO_2$, NiMH, and Li—$SO_2$.

Preferably, the internal surface 16 is sized to accommodate the electrochemical cell 11 with a minimal gap between the outer surface of the electrochemical cell and the internal surface 16 of the cell housing 12. Minimizing the gap serves at least three purposes. First, minimizing the gap reduces the amount of heat-insulating air thus reducing the thermal resistivity of the case. Second, minimizing the gap allows for a smaller overall volume thus increasing the volumetric packaging efficiency. Third, minimizing the gap reduces the amount of cell vibration that could occur within, the cell housings 12 when the battery case 1 is moved. Preferably, the gap is less than 0.1 inch at most.

To reduce cell vibration and improve thermal resistivity, the gap can be filled with, for example, an epoxy or other heat conductive substance, such as a thermal filler, that effectively absorbs physical shock and/or has a high coefficient of friction. The internal surfaces 16 of the cell housings 12 can be coated with the epoxy before the electrochemical cells 11 are installed. Alternatively, epoxy can be injected into the gaps after the electrochemical cells 11 are installed.

Figure 7A:
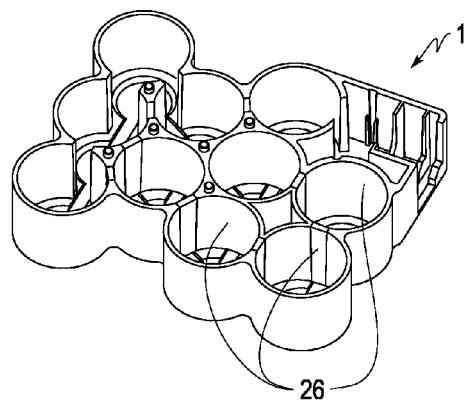
FIGS. 7A and 7B show elevated sectional views of a lower casing of a battery case in an embodiment.

FIG. 7A shows an elevation view of a battery case 1 in another embodiment. As an alternative or in addition to epoxy, for example, the gap can be filled with a sleeve 26 designed to fit the cylindrical shape of the cell 11. The sleeve 26 is preferably made of at least one heat conductive material selected from the group consisting of metal, composite, and polymer, thus increasing the rate of thermal dissipation. However, the sleeve 26 may be made of any heat conductive material that may be shaped to fit a cell 11. Preferably, the sleeve 26 substantially wraps around the outer circumferential surface of the cylindrical cell 11. This prevents cell 11 from making contact with adjacent cell 11 and potentially causing a short circuit, thereby obviating the need for, for example, producing shrink-wrapped cells and thus lowering manufacturing costs.

Figure 7B:
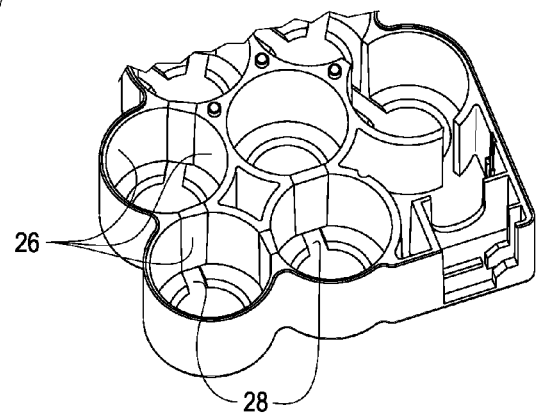

FIG. 7B shows an elevated sectional view of a battery case 1 in another embodiment. In this embodiment, the sleeve 26 may also have openings 28 in it for cell connector tabs (not shown) to adjacent cells and/or pockets for gas exhaust. Preferably, the openings 28 may be at an edge of the sleeve 26, as shown in FIG. 7B, but they may also be at the midsection or other non-edge portion of the sleeve 26.

Figure 8:
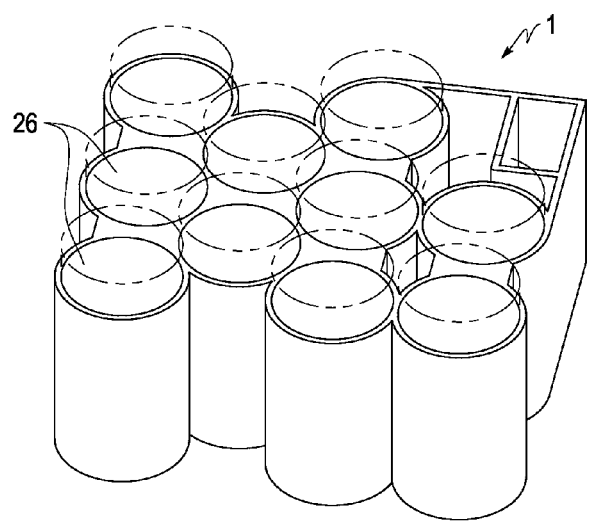
FIG. 8 shows an elevation view of a battery case in an embodiment.

FIG. 8 shows an elevation view of a battery case 1 in another embodiment. The sleeve 26 may extend completely or almost to the top of the enclosed cell 11. The sleeve 26 may also enclose a bottom surface or top surface or both of the cell 11 (i.e., the circular ends of the cylindrical cell) depending on, for example, weight, fit, and thermal conductivity requirements of the cells 11. If the sleeve 26 encloses both the bottom surface and a top surface of the cell 11, it may also be designed to have an insertion/extraction opening through which the cell 11 can be inserted or extracted.

Figure 11:
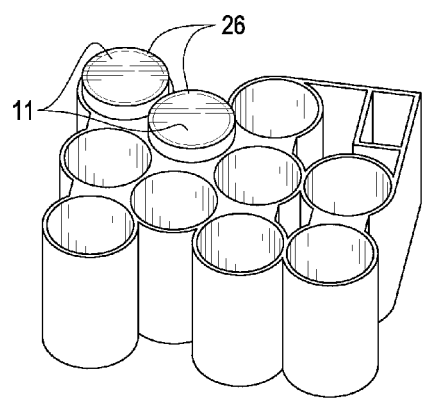
FIG. 11 shows an elevation view of a battery case in another embodiment.

FIG. 11 shows an elevation view of another embodiment of the claimed invention. The sleeve 26 may only enclose the outer circumferential surface of a cell 11 and not the top and bottom of the cell 11.

FIG. 3 shows an elevation view of a battery case 1 in another embodiment. In this embodiment, the battery case 1 is made of two pieces: an upper casing 6 with a plurality of upper casing cavities, and a lower casing 8 with a plurality of lower casing cavities. The casings may be formed to fit one another so that the lower casing cavities and upper casing cavities define the internal spaces 14 of the plurality of cell housings 12. For example, a battery case 1 designed to fit substantially cylindrical cells 11 may have lower casing cavities shaped to fit lower portions of the cylindrical cells and upper casing cavities shaped to fit upper portions of the cylindrical cells. FIG. 3 shows an equatorial plane 10 as the plane where the upper casing 6 fits the lower casing 8 at the bisections of the cell housings 32, thus giving the upper casing 6 and lower casing 8 approximately the same volume. However, in another embodiment, it may be preferred to have an upper casing 6 and lower casing 8 fit at a plane that does not substantially bisect the cells 11. For example, CFx batteries and batteries with CFx-hybrid chemistries tend to output the most heat at their midsections. For manufacturing reasons, the plane at which the casings fit each other may be unable to dissipate as much heat. Thus, having the casings fit each other at an equatorial plane 10 for CFx batteries and batteries with CFx-hybrid chemistries would dissipate less heat than having the casings fit each other in some other way. For example, the casings could fit each other closer to one end of where the cells 11 would be situated within the cell housings 12. In this case, the casings may have substantially different volumes. Further, each upper casing cavity may have a substantially different volume than the lower casing cavity to which the upper casing cavity corresponds. However, when an upper casing 6 is fitted to a lower casing 8 with a different volume, the overall volume of the battery case 1 and shape of the exterior casing 2 may still be the same as if the casings had the same volume.

The upper casing 6 and lower casing 8 may each be machined to achieve the desired shape. Preferably, the casings may each be molded into a single piece. Thus, the upper casing 6 would be a first unitary structure, and the lower casing 8 would be a second unitary structure. Alternatively, the casings may be manufactured by depositing or forming layers of material in succession so as to build up each casing's structure, or by 3-D printing.

Figure 9A:
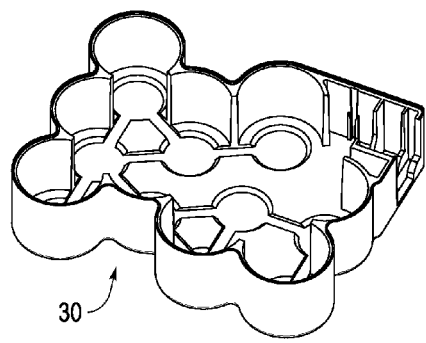
FIGS. 9A and 9B show elevated sectional views of a battery case in an embodiment.
Figure 9B:
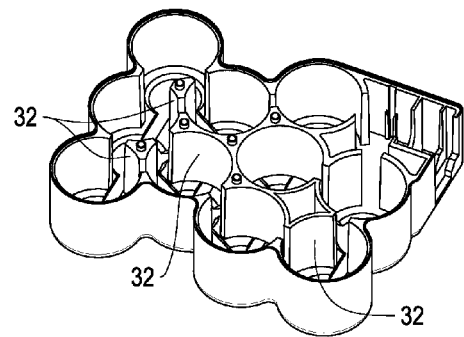

FIGS. 9A and 9B show elevated sectional views of a battery case 1 in another embodiment. In this embodiment, the battery case 1 is made of more than two pieces. FIG. 9A shows one of two base pieces 30 (i.e., either the upper casing 6 or the lower casing 8) without any interior walls. FIG. 9B shows multiple interior pieces 32 serving as the interior walls. Alternatively, the interior piece 32 may consist of a single unitary piece that defines all of the interior walls. Further, both of the two base pieces 30 may be made without any interior walls, as shown in FIG. 9A. In this preferred embodiment, it is possible to have a single interior piece 32 be sufficiently long to span the interior walls of the upper casing 6 and the lower casing 8, thereby allowing for a design where the battery case 1 is made from three pieces: an upper casing 6, a lower casing 8, and a single interior piece 32. Preferably, the interior pieces 32 are made of a heat conductive filler material 24 selected from the group consisting of metal, composite, and polymer. However, the interior pieces 32 may be made of any heat conductive material. The interior pieces 32 could be extruded, molded, stamped, assembled of smaller components, 3-D printed, or manufactured by other known techniques.

Figure 12:
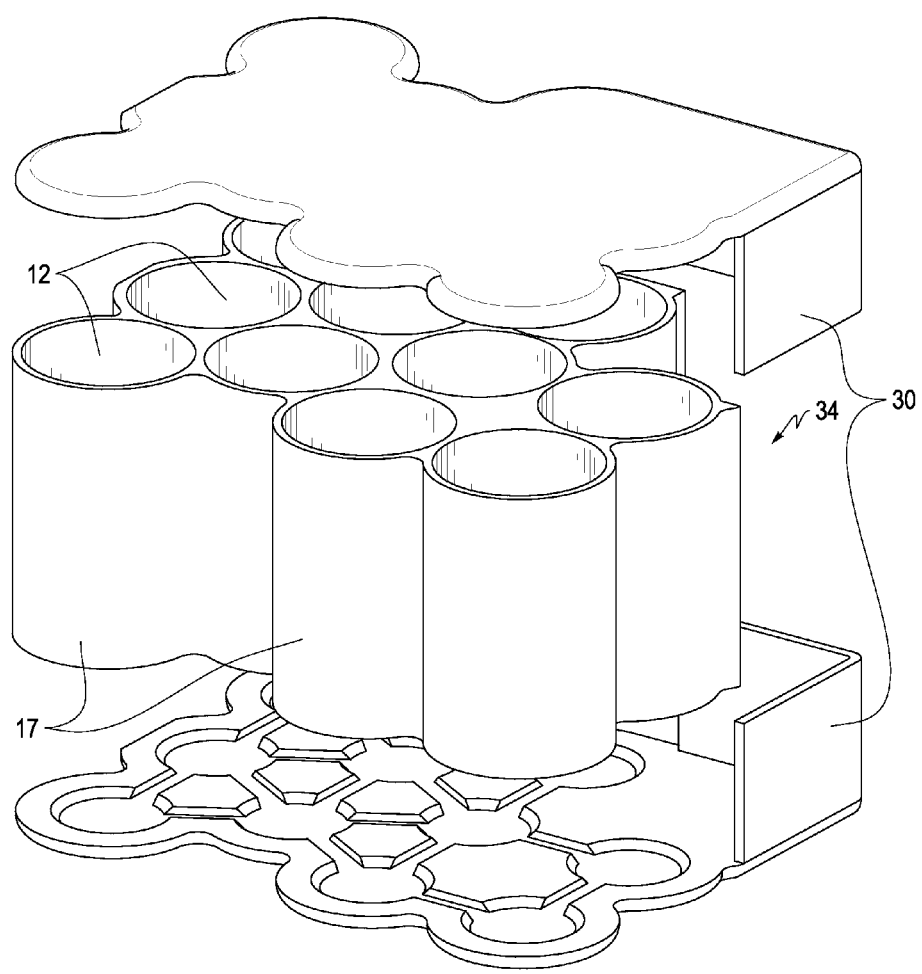
FIG. 12. shows an exploded view of a battery case in another embodiment.

FIG. 12 shows an exploded view of a battery case 1 in another embodiment. In this embodiment, the battery case 1 is made of exactly three pieces: the two base pieces 30 and a middle piece 34 that defines all walls 17 (i.e., both interior and exterior walls) of the cell housings 12. Such a design may reduce manufacturing costs when the walls 17 of the cell housings 12 are to be made of a different material, or with the same material but with a different manufacturing technique such as extrusion, than the base pieces 30. As with the two-piece embodiment described above, the base pieces 30 and the middle piece 34 may be extruded, molded, stamped, assembled of smaller components, 3-D printed, or manufactured by other known techniques.

Figure 10A:
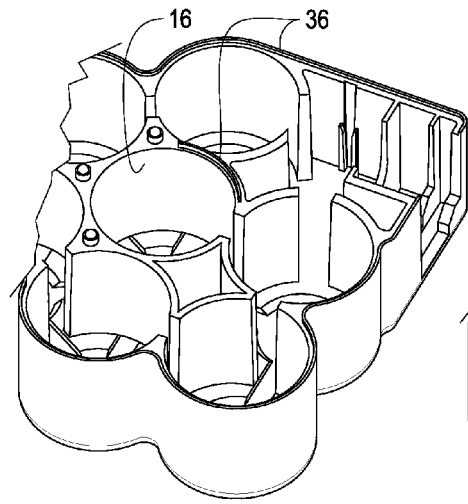
FIGS. 10A and 10B show zoomed elevated sectional views of a battery case in an embodiment.
Figure 10B:
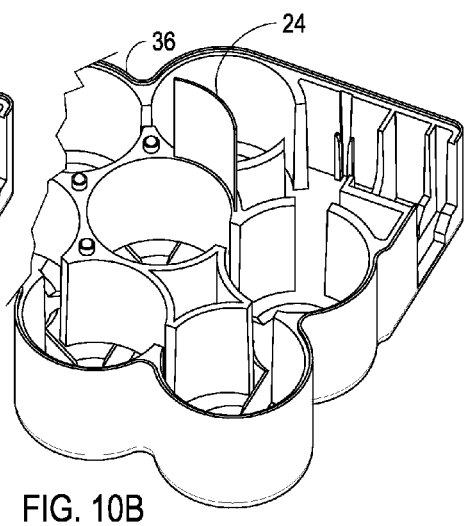

FIGS. 10A and 10B show zoomed elevated sectional views of a battery case 1 in another embodiment. In this embodiment, as shown in FIG. 10A, a cell housing 12 has a hollowed volume 36 between first the internal surface 16 and second the external surface 22 or adjacent cell housing 12. The hollowed volume 36 has a curvilinear shape to substantially match that of the wall 17 defined by the internal surface 16 and the external surface 22 or adjacent cell housing 12. The hollowed volume 36 may also extend to the walls of the electronic component housing 18. Preferably, as shown in FIG. 10B, the hollowed volume 36 is filled with a heat conductive filler material 24 selected from the group consisting of metal, composite, and polymer. However, the hollowed volume 36 may be made of any heat conductive material.

The foregoing disclosure refers to composites in general, and viable composites includes, but are not limited to, Ceramacast 675N, aluminum nitride, aluminum, graphite, CoolPoly D4302, and other thermally conductive material mixed with epoxy.

The foregoing disclosure refers to polymers in general, and viable polymers include, but are not limited to, Noryl, CoolPoly D4302 thermally conductive copolyester elastomer, CoolPoly D5120 thermally conductive polyphenlyene sulfide, CoolPoly D5506 thermally conductive liquid crystal polymer, CoolPoly D3620 thermally conductive polyamide, polylactic acid, and Duraform EX plastic (used, for example, in 3-D printing).

The foregoing disclosure refers to the battery case 1, but the invention may also include a battery pack with the battery case 1 and a battery that includes a plurality of electrochemical cells and at least one electronic component.

The illustrated exemplary embodiments of the battery case and battery pack as set forth above are intended to be illustrative and not limiting. Various changes may be made without departing from the spirit and scope of the invention.

What is claimed is:

1. A battery case for housing a battery with a plurality of electrochemical cells and at least one electronic component, the battery case comprising:
   a plurality of interconnected cell housings that each (1) define an internal space sized to accommodate one of the electrochemical cells, and (2) include
      (a) an internal surface that is contoured to a shape of the one of the electrochemical cells to be housed by the cell housing, and
      (b) an external surface that is in contact with another external surface of at least one other cell housing; and
   at least one electronic component housing that accommodates the at least one electronic component, wherein the cell housings and the at least one electronic component housing being defined by top and bottom surfaces, such that for each of the top and bottom surfaces, the at least one electronic component housing is unitary with at least one of the cell housings.

2. The battery case of claim 1, wherein the external surfaces of the cell housings define a plurality of interior volumes that are external to each of the cell housings and internal to an outer periphery of the battery case.

3. The battery case of claim 2, wherein
   at least one of the interior volumes houses a heat conductive filler material selected from the group consisting of metal, composite, and polymer.

4. The battery case of claim 1, wherein the external surface of each cell housing also is contoured to the shape of the electrochemical cell to be housed therein.

5. The battery case of claim 1, wherein the internal surface of each cell housing is cylindrical to match the electrochemical cells having a substantially cylindrical shape.

6. The battery case of claim 5, wherein
   each of the cell housings completely encloses an outer circumferential surface of the electrochemical cell to be accommodated by the cell housing.

7. The battery case of claim 1, wherein
   the internal surface is sized to accommodate the at least one electrochemical cell with a gap of no more than 0.1 inch between the outer surface of the electrochemical cell and the internal surface.

8. The battery case of claim 1, wherein
   the cell housings are made of at least one heat conductive material selected from the group consisting of metal, composite, and polymer.

9. The battery case of claim 1, wherein
   the internal surface of each cell housing has a non-prismatic shape to match the electrochemical cells having a non-prismatic shape.

10. The battery case of claim 1, wherein
   at least one of the cell housings defines an opening connecting a first internal space defined by the cell housing to a second internal space defined by an adjacent cell housing.

11. The battery case of claim 1, further comprising:
   a lower casing defining a plurality of lower casing cavities; and
   an upper casing defining a plurality of upper casing cavities equal to the number of lower casing cavities, wherein the upper casing is formed to fit the lower casing so that the lower casing cavities and the upper casing cavities define the internal spaces of the plurality of cell housings, and the lower casing and the upper casing together define the plurality of cell housings.

12. The battery case of claim 11, wherein
   a volume of each of the lower casing cavities is less than a volume of each of the upper casing cavities.

13. A method of manufacturing the battery case of claim 11, comprising the steps of:
   molding the lower casing into a single lower piece; and
   molding the upper casing into a single upper piece.

14. A method of manufacturing the battery case of claim 11, comprising the steps of:
   creating the lower casing and the upper casing by depositing or forming layers of material in succession using 3-D printing so as to build up a structure of the lower casing and a structure of the upper casing.

15. The battery case of claim 1, wherein a shape of the electronic component housing is different from a shape of each of the cell housings.

16. The battery case of claim 1, wherein an outer periphery of the battery case includes four non-planar sides.

17. A battery pack comprising:
   a battery including a plurality of electrochemical cells and at least one electronic component; and
   the battery case of claim 1.

18. A battery case for housing a battery with a plurality of non-prismatic electrochemical cells and at least one electronic component, the battery case comprising:
   a plurality of cell housings that each (1) define an internal space sized to accommodate one of the electrochemical cells, and (2) include
      (a) an internal surface at least a portion of which is shaped to substantially correspond to a non-prismatic exterior surface of the one of the electrochemical cells to be housed by the cell housing, and
      (b) an external surface at least a portion of which follows contours of a corresponding portion of the inner surface; and
   at least one electronic component housing that accommodates the at least one electronic component, wherein the cell housings and the at least one electronic component housing being defined by top and bottom surfaces, such that for each of the top and bottom surfaces, the at least one electronic component housing is unitary with at least one of the cell housings.

19. The battery case of claim 18, wherein each of the plurality of cell housings has a wall defined by the internal surface and the external surface and that has a substantially uniform thickness.

20. The battery case of claim 18, wherein
the external surfaces of each of the cell housings define a plurality of interior volumes that are external to each of the cell housings and internal to an outer periphery of the battery case.

21. The battery case of claim 1, wherein
the internal surfaces not adjacent to the external surfaces contact exterior top and bottom surfaces of the case, and facilitate efficient heat transfer.

22. The battery case of claim 18, wherein
the internal surfaces not adjacent to the external surfaces contact exterior top and bottom surfaces of the case, and facilitate efficient heat transfer.

23. The battery case of claim 1, wherein the interconnected cell housings each include walls having a substantially uniform cross-section that define the internal surface.

24. The battery case of claim 1, the external surface forms an arcuate shape exterior of the battery case.

25. The battery case of claim 1, for each of the top and bottom surfaces, the at least one electronic component housing and all of the cell housings form a single unitary structure.

26. The battery case of claim 1, wherein the external surfaces of the cell housings, contoured to the shape of the electrochemical cells, and the electronic component housing define an outer periphery of the battery case.

* * * * *